United States Patent [19]

Taylor

[11] 4,052,033
[45] Oct. 4, 1977

[54] EJECTOR PIN RETRACTING MEANS FOR PLASTIC MOLDING DIES

[75] Inventor: William L. Taylor, Phoenix, Ariz.

[73] Assignee: Pixley Richards West, Inc., Tempe, Ariz.

[21] Appl. No.: 727,301

[22] Filed: Sept. 29, 1976

[51] Int. Cl.² .......................... G05G 5/08; B29C 7/00; B29F 1/14
[52] U.S. Cl. ...................... 249/67; 249/68; 249/205; 74/527
[58] Field of Search ............. 249/66, 67, 68, DIG. 5, 249/205

[56] References Cited
U.S. PATENT DOCUMENTS

| | | | |
|---|---|---|---|
| 2,483,094 | 9/1949 | Harvey | 249/68 |
| 3,125,801 | 3/1964 | Fields | 249/68 X |
| 3,516,302 | 6/1970 | Muttart | 249/68 X |
| 3,986,805 | 10/1976 | Haines | 249/68 X |

Primary Examiner—J. Howard Flint, Jr.
Attorney, Agent, or Firm—Warren F. B. Lindsley

[57] ABSTRACT

The disclosure relates to an ejector pin retracting means for plastic molding dies and die cast molds; the retracting means being commonly known as an early return system for retracting ejector pins into a mold cavity into flush relationship with a surface thereof before a conventional laterally moving slide mechanism is actuated, and thereby preventing the slide mechanism from hitting the extended ejector pins and causing damage thereto. The invention comprises resilient means operable by a return rod, the resilient means being engageable by the rod and resiliently expandable to permit the rod to pass therethrough after the rod has applied sufficient force to the resiliently expandable means so as to retract the ejector pins into one of the mold cavities and into flush relationship with an inner surface thereof.

5 Claims, 13 Drawing Figures

EJECTOR PIN RETRACTING MEANS FOR PLASTIC MOLDING DIES

BACKGROUND OF THE INVENTION

Prior art early return mechanism, such as shown in U.S. Pat. No. 3,516,302, comprise slideable detent means operable by a return rod and such slideable means comprises elements which due to their sliding action, are subject to friction depending upon the pressure exerted thereagainst and such slideable detent means has heretofore been used to provide for the early return of ejector pins from a mold cavity before complimental molding die cavities are closed to thus prevent damage to the ejector pins from a mold cavity before complimental molding die cavities are closed to thus prevent damage to the ejector pins by the dies as they are closed together for the next successive molding operation. The slideable detent mechanism, such as shown in the aforementioned patent, is provided with a multiplicity of small parts and is also difficult to produce and therefore is costly and relatively complex in operation.

SUMMARY OF THE INVENTION

The present invention comprises a novel ejector pin retracting means for plastic molding dies and die cast molds and particularly to a resiliently loaded ejector pin return and detent means which comprises resiliently expandable means not limited to substantial sliding friction, the invention comprising several species of the aforementioned resillently loaded ejector pin return and detent means which operate to provide for the early return of ejector pins into a die cavity in flush relationship with an inner surface thereof to prevent a laterally moveable slide mechanism from hitting the extended ejector pins.

In a preferred specie of the invention, the ejector pin return and detent means comprises a single generally tubular member having a plurality of resilient fingers surrounding a bore extending through the tubular member, the fingers being adapted to be spread apart by a return rod and the outer portions of the fingers being expandable by the return rod when forced therebetween such as to be of a greater external dimension than the bore of a sleeve fixed to one of the die cavity members and whereby, when the aforementioned fingers are in the bore of the sleeve, the internal space between the fingers is less than the cross-section of the return rod, such that the return rod applies force to the ends of the fingers and thus, forces them out of the bore of the sleeve at the beginning of the closing of one die relative to the other and thus, movement of the fingers out of the last mentioned bore by reason of the return rod causes an ejector pin carrying member to move in a direction to retract the ejector pins into their respective die cavity into flush relationship with an inner surface thereof and out of the way of laterally moveable slide mechanism so as to prevent the slide mechanism from hitting the extended ejector pins. The specific structure of the preferred ejector pin return and detent means comprises a generally circular array of resilient fingers which are formed generally of a circular cross section structure, and wherein slots separate the fingers such that they may be resiliently deflected outward relative to each other and relative to a bore extending through the tubular member with which the fingers are integral, the fingers being closer together at one end of the tubular member than the cross section of the complimental return rod and the bore of the tubular member near the opposite end thereof being large enough to allow the return rod to pass therethrough when it has forced the fingers apart by passing therebetween. The fingers are provided with generally frusto-conical cam surfaces diverging outwardly from the respective end of the bore and the return rod is provided with a generally conical or frusto-conical surface adpated to cooperate with the aforementioned cam surfaces on the ends of the fingers so as to force the fingers apart after the fingers have passed out of the bore at one end of the aforementioned sleeve.

Other species of the invention comprise an ejector pin return and detent means having a tubular body with a bore therein and having a plurality of fingers pivotally mounted thereon and surrounded by resilient means such as coil spring or the like, so as to operate in a similar manner to the aforementioned ejector pin return and detent means.

A further specie of the invention comprises a generally ring shaped resiliently loaded ejector pin return and detent means which is peripherally expandable by means of a return rod and this generally ring shaped structure provides for sufficient resistance to the passage of the return rod relative to the ejector pin carrying member so as to apply sufficient force thereon to retract the ejector pins relative to a die cavity before the complimental cavity closes relative thereto.

Accordingly, it is an object of the present invention to provide a novel ejector pin retracting means for plastic molding dies which is an improvement over the art and which is very efficient in the operation of the early retraction of ejector pins into a die cavity into flush relationship with an inner surfaces thereof preliminary to the movement of laterally moveable slide mechanism and thereby preventing said mechanism from hitting or damaging the extended ejector pins.

Another object of the invention is to provide a novel ejector pin and retracting means for plastic molding dies and die cast molds which obviates the complexity and frictional problems relative to operation of some prior art mechanisms.

Another object of the invention is to provide an early return ejector pin retracting means of plastic molding dies which is resiliently contractable and expandable and thereby simplifies operation as well as to avoid the fricitional sliding characteristics of locking mechanisms found in prior art devices.

Another object of the invention is to provide a very simple early return ejector pin retracting means for plastic molding dies which involves simple machine turning and slotting operations to produce the resilient contractable and expandable ejector pin detent means of the invention.

Another object of the invention is to provide a variety of species of the early return ejector pin retracting means for plastic molding dies, all of which utilize resilient means allowing expansion and contraction of the ejector pin return and detent means whereby sliding friction and complex structure of such mechanism is obviated.

Another object of the invention is to provide an early return ejector pin retracting means for plastic molding dies which is very simple and reliable in its mode of operation.

Another object of the invention is to provide a very compact early ejector pin retracting means of plastic molding dies which is of such small dimension that it may readily be installed internally in very small molds which has been impossible with the more bulky prior art early return mechanisms.

Another object of the invention is to provide an early return ejector pin retracting means for plastic molding dies which is very positive in its early return action.

Further objects and advantage of the ivention may be apparent from the following specification, appended claims and accompanying drawings.

DESCRIPTION OF THE PREFERRED EMBODIMENTS

Figure 1:
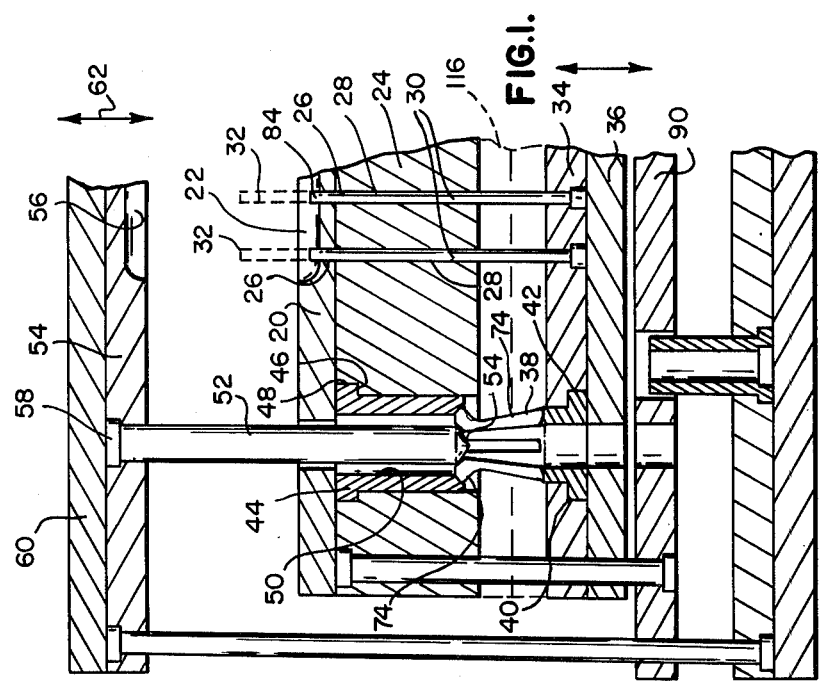
FIG. 1 is a fragmentary sectional view of a set of plastic molding dies showing the ejector pin retracting means of the invention in connection therewith and illustrating by broken lines varrying positions of the ejector pins relative to one of the die cavities disclosed therein.

As shown in FIG. 1 of the drawings, a first die cavity member 20 is provided with a plastic molding cavity 22 therein. This die cavity member 20 is fixed to a support plate 24 adapted to support the die cavity member 20 in juxtapostion. Openings 26 and 28 in the die cavity member 20 and member 24 respectively suppot ejector pins 30, which are reciprocally mounted therein and adapted to extend in and out of the cavity 22 as indicated by broken lines 32 in FIG. 1 of the drawings.

The ejector pins 30 are fixed to an ejector pin carrying plate 34 and backup plate 36 is fixed thereto for retaining the pins 30 in juxtaposition thereto.

Mounted on the ejector pin carrying plate 34 and held in connection therewith by the plate 36 is the ejector pin return and detent means 38 of the invention. This member 38 is provided with a peripheral flange 40 which is held captive in a recess 42 of the plate 34 and in adjacent relationship to a contiguous side of the plate 36, which is fixed relative to the plate 34.

A sleeve 44 is fixed relative to the die cavity member 20 by the plate 24 which is provided with a recess 46 retaining a peripheral flange 48 of the sleeve 44.

An ejector pin return rod 52 is fixed to a second die cavity member 54 which is provided with a cavity 56 complimental to the cavity 22 hereinbefore described. The ejector pin return rod 52 is provided with a head 58 held captive relative to the die cavity member 54 by a plate 60 which is contiguous thereto. The die cavity member 54 is moveable toward and away from the die cavity member 20 as indicated by the double ended arrow 62 in FIG. 1 of the drawings. Thus, the cavity 56 may be closed in contiguous relation with the cavity 22 or may be moved to open position as shown in FIG. 1 of the drawings for ejection of parts by the ejector pin 30 which are projectable into the broken line position 32 as shown in FIG. 1.

Figure 2:
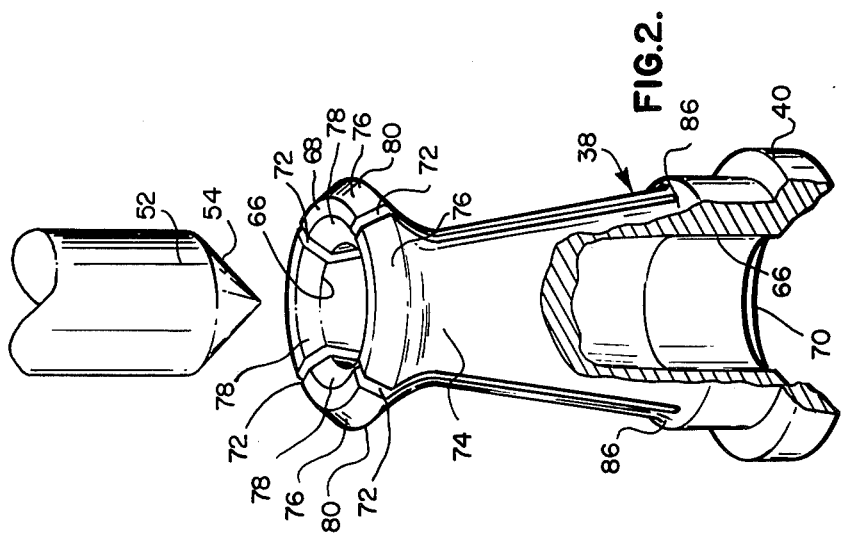
FIG. 2 is an enlarged perspective view of the ejector pin return and detent means and a portion of a return rod of the invention and showing portions of the detent means broken away and in section to amplify the illustration.

As shown in FIGS. 1 and 2 of the drawings, the ejector pin return and detent means comprises a detent member generally designated 38. This member 38, as hereinbefore described, has a peripheral annular flange 40 fixed in the recess 42 of the ejector pin carrying plate 34.

The member 38 is provided with a bore 66 adapted to receive the return rod 52 at its conical end 54 and the diameter of the rod 52 is greater than the diameter of the bore 66 at an end 68 of the ejector pin return and detent member 38. The bore 66 adjacent an opposite end 70 is sufficiently large to allow the rod 52 to slide through, as will be hereinafter described.

The side wall of the member 38 is provided with a plurality of slots 72 which separate the side wall of the generally tubular structure into a plurality of resilient fingers 74. These fingers 74 are provided with frusto-conical end surfaces 76 and are provided wih internally disposed frusto-conical surfaces 78. These surfaces diverge outwardly from the bore 66 and are adapted to cooperate with the conical portion 54 of the rod 52 which, when forced therein, causes camming action against the surfaces 78 and spreads the fingers 74 apart such as to extend the frusto-conical surfaces 76 radially outward as will be hereinafter described.

The fingers 74 are resilient structures normally tending to maintain the positions shown in FIG. 2, wherein these fingers 74 are retracted such that the bore 66 at the end 68 of the member 38 is smaller than the diameter of the rod 52.

The frusto-conical portions 76 are provided with peripheral edge portions 80 and these portions 80, when resiliently retracted as shown in FIG. 2 of the drawings, are diametrically disposed to readily pass into the bore 50 of the sleeve 44 shown in FIG. 1 of the drawings.

Figure 3:
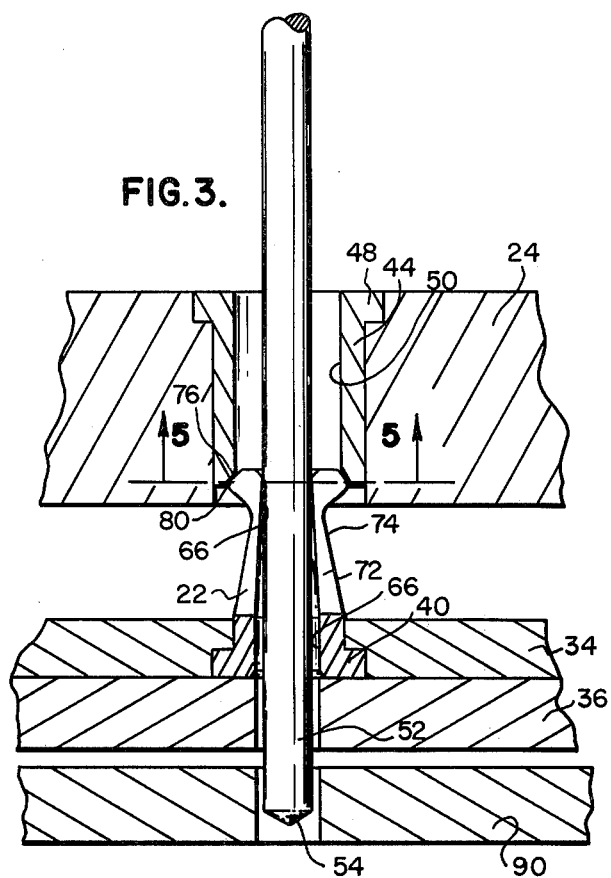
FIG. 3 is an enlarged fragmentary sectional view of portions of the die mechanism shown in FIG. 1 illustrating a position of the ejector pin return and detent means corresponding with a retracted position of the ejector pins wherein they are retracted from a die cavity.
Figure 4:
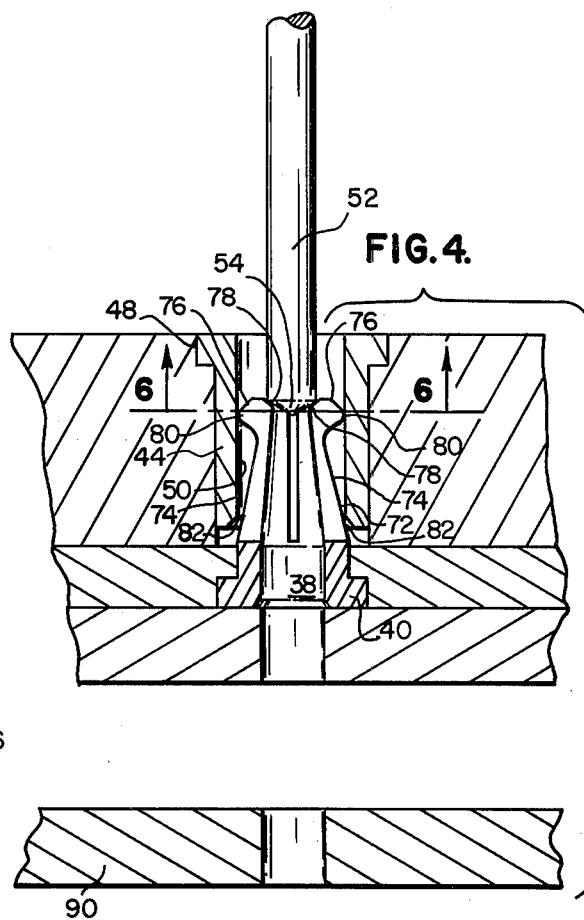
FIG. 4 is another view similar to FIG. 3 but showing the ejector pin return and detent means in a position wherein the ejector pins are extended into a die cavity and in position to eject a molded part therefrom.

This relationship is also shown in FIGS. 3 and 4 of the drawings, and particularly in FIG. 4 wherein the peripheral portions 80 of the fingers 74 are retracted into the bore 50 of the sleeve 44. This sleeve 44 is provided with a frusto-conical cam portion 82 which converges inwardly into the bore 50 at an end of the sleeve opposite to the flange 46 as hereinbefore described. The frusto-conical cam portion 82 is adpated to cooperate with the complimental portion 76 of the fingers 74 when the rod 52 is projected between the fingers 74 to spread them apart such that the portions 76 of the fingers 74 bear against the frusto-conical cam portion 82 and prevent the ejector pin carrying plate 34 from moving toward the die cavity member 20 and thus prevent ends 84 of the ejector pins 30 from being projector into the cavity 22 until the molding operation is complete and until the die cavity member 54 is opened relative to the die cavity member 20 as will be hereinafter described.

The bore 66 in the ejector pin return and detent member 38 is enlarged near the flange 40 and beyond the fingers 74 so as to freely receive the rod 52. The fingers 74, when in a normally retracted position as shown in FIG. 2, are sufficiently close together so that the bore 66 at the ends of the fingers is smaller than the diameter of the rod 52 and thus, the fingers are spread apart when the rod 52 is forced therebetween by means of the cam or conical portion 54 is slideably entering the converging cam portions 78 of the fingers 74 hereinbefore described.

Figure 5:
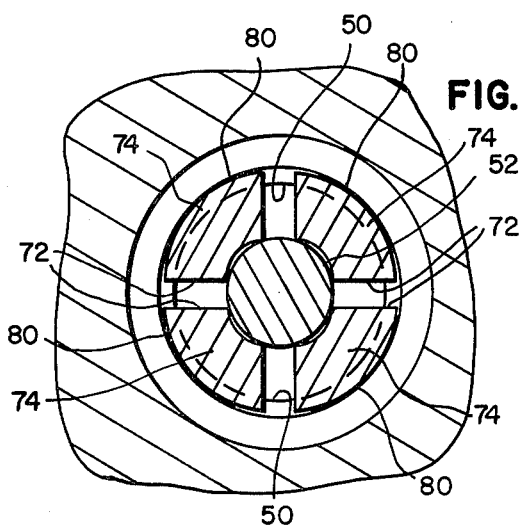
FIG. 5 is an enlarged sectional view taken from the line 5—5 of FIG. 3.
Figure 6:
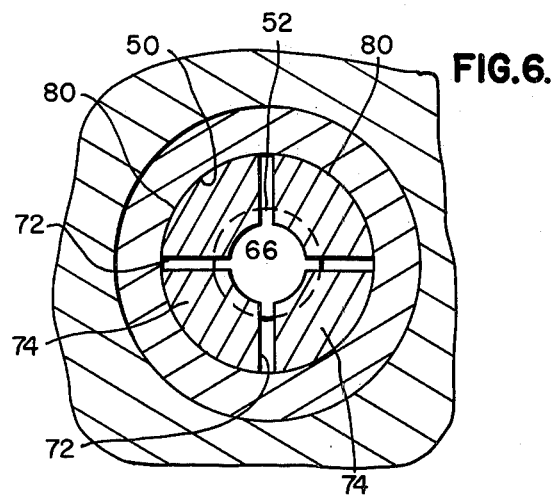
FIG. 6 is an enlarged sectional view taken from the line 6—6 of FIG. 4.

As shown in FIGS. 5 and 6, it will be seen that there are four of the fingers 74 separated by the respective slots 72.

With reference to FIG. 2 of the drawings, it will be appreciated that the fingers 74 are resilient and flex outward when pressed apart by the rod 52, as hereinbefore described, and that the slots 72 terminate at positions referenced 86 in FIG. 2 of the drawings and that the longitudinal section of these fingers 74 tapers in thickness from relative thick strucutre at the location of the ends 86 of the slots toward the cam surface end portions 76. Thus, resilient deflection and retraction of these fingers is possible while maintaing a substantially rigid structure longitudinally to the bore 66.

The resiliently expandable and contractable functions of the fingers 74 in cooperation with the rod 52 provides a mode of operation which does not depend upon sliding friction of a plurality of small parts common to devices of the prior art, such as shown in U.S. Pat. No. 3,516,302.

In operation, the member 38, when in the position shown in FIG. 4, is disposed inside the bore 50 of the sleeve 44 and the ejector pins 30 are extended to broken line positions 32 at which position they eject a molded part from the cavity portion 22 while the cavity 56 is in the open position relative thereto. After the molded part has been released from the cavities 22 and 56, the die cavity member 54 is moved toward the die cavity member 20 so that the cavity 56 may cooperate with the cavity 22 and the return rod 52 is then, as shown in FIG. 4 of the drawings, in engagement with the cam surfaces 78 of the fingers 74.

At this time, the peripheral portions 80 are retained in the bore 50 and thus, the fingers 74 cannot be spread apart. The result is that the rod 52 exerts axial pressure on the fingers 74 and such results in the movement of the ejector pin carrier plate 34 in a direction away from the die cavity plate 20. Thus, retracting the ejector pins to a position in which their ends 84 are substantially flush with the cavity 22 and as the movement of the ejector pin carrying plate 34 progresses to a position shown in FIG. 3, the resilient character of the fingers 74 permits the conical cam portion 54 on the end of the rod 52 to spread the fingers apart as they reach the open end of the sleeve bore 50 and the cam portions 76 are forced outward adjacent to corresponding angularly disposed frusto-conical surfaces of the frusto-conical portion 82 whereupon the rod 52 may progress onward through the enlarged portion of the bore 66 and on downward through the plates 36 and an adjacent plate 90, as shown in FIGS. 1, 3 and 4 of the drawings. Thus, the cavity member 54 may be closed relative to the cavity member 20 so that the cavities 56 andd 22 cooperate for the molding of another part.

As the die cavity member 54 is again opened relative to the die cavity member 20, the rod 52 passes upwardly through and betweeen the fingers 74 and as it passes the ends of the fingers 74, they retract resiliently and are of an overall assembly diameter such that the peripheral portions 80 pass into the bore 50 as the ejector pin carrying plate 34 is actuated, by conventional means not disclosed herein, in a direction toward the die cavity member 20 to project the pins 30 to the broken line positions 32 for ejecting the molded plastic part from the cavity 22.

Accordingly, it will appreciated that the pins 30, as hereinbefore described, are retracted early during the movement of the dies together and that the resilient fingers 74 operate without substantial sliding friction and constitute a single piece which may simply be machine turned and slotted to facilitate the production of the part, as well as to provide for the durability thereof and efficient operation thereof.

As shown in FIG. 5 of the drawings, the fingers 74 are spread apart by entrance of the rod 52 therebetween and it will be seen that the peripheral portions 80 are then extended beyonw the bore 50 of the sleeve 44. Thus, the rod 52, when forced between the fingers 74, causes the slots 72 to widen and causes the peripheral portions 80 to be distended outward beyond theinternal diameter of the bore 50, all as shown best in FIG. 5.

As shown in FIG. 6, the fingers at their peripheral portions 80 are disposed in the bore 52 of the sleeve 44 and it will be seen that the diameter of the rod 52 is considerably greater than the normal bore 66 between the fingers 74 and that each finger comprises a quadrant of the bore 66, all as shown best in FIG. 6 of the drawings.

It will be seen that the slots 72, shown in FIG. 6 of the drawings, are at their normal width which is substantially less than distended width of the slots 72, shown in FIG. 5, thereby illustrating the degree to which the fingers 74 are forced apart by the rod 52, all as hereinbefore described.

In accordance with the foregoing, it will be seen that the action of the early return mechanism hereinbefore described is very positive in its action and it will be apparent that the mechanism may be made on very small scale and particularly adapted for use in very small mold and die mechanisms.

It will be understood that conventional lateral slide mechanisms, which move laterally of the axis of the pins 30 are well known and may be operable in connection with the die cavities 22 and 56 and that the early return mechanism of the invention provides for the early return of the pins 30 into flush position with the surface of the cavity 22 before such lateral slide mechanisms are actuated.

It will be understood that these mechanisms are not shown in the drawings, but are conventional to plastic molding dies and the principal object of the operation of the early return mechanism hereinbefore described is to retract the pins 30 at their ends into flush position with the internal surface of the cavity 22 before the slide mechanisms are operated, so as to avoid interference thereof with the extended pins and to prevent the pins from being damaged during movement of the laterally operable slide mechanisms, all of which is well known to those skilled in the art of lateral slide mechanisms and ejector pins normally used in plastic molding dies or the like.

Figure 7:
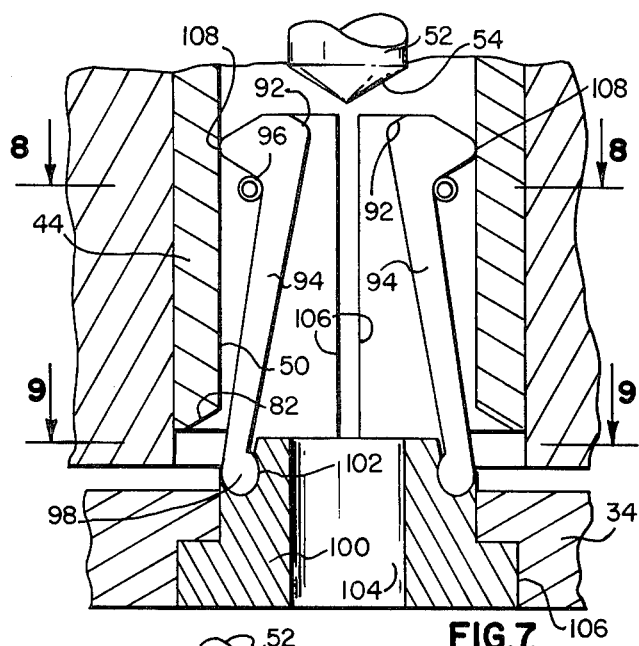
FIG. 7 is a view similar to FIG. 4 but showing a modified structure on enlarged scale.

In the modification, as shown in FIG. 7, rod 52 at its conical end 54 engages cam surfaces 92 of fingers 94; the cam surfaces 92 corresponding with the surfaces 78 of the fingers 74 hereinbefore described. These fingers are surrounded by a coil spring 96 resiliently tending to hold them together and each finger 94 is provided with a captive pivot portion 98 mounted in a tubular member 100; the mounting at 102 of each portion 98 covers more than 180° of a generally circular in cross section structure of the pivot portion 98. Thus, the fingers 94 are free to pivot inward and outward relative to the axis of a central bore 104 which corresponds to the lower end of the bore 66 at the end 70 of the structure shown in FIG. 2 of the drawings. The fingers 94 are spaced apart at adjacent edges 106 providing a similar relationship between the fingers as compared to the slots 72 hereinbefore described. The functional operation of the resiliently mounted fingers 94 is similar in very respect to that hereinbefore described, except that these fingers are pivoted rather than being integral with the base structure of the device which is represented by the portion 100, shown in FIG. 7 of the drawings. This structure 100 is provided with a peripheral flange 106 mounted in the ejector pin carrier plate 34.

Figure 8:
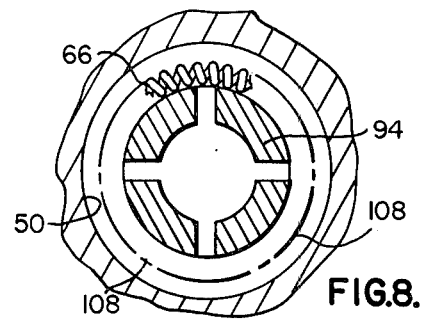
FIG. 8 is a fragmentary sectional view taken from the line 8—8 of FIG. 7.
Figure 9:
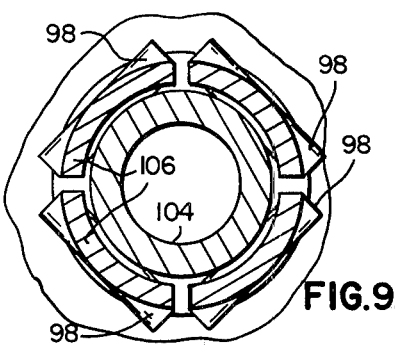
FIG. 9 is a fragmentary sectional view taken for the line 9—9 of FIG. 7.

The fingers are provided with peripheral portions 108 similar to the portions 80 of the fingers 74 and, as shown in FIG. 8 of the drawings, these peripheral portions 108 are contiguous to the bore 50 when the position as shown in FIG. 7 of the drawings.

Figure 10:
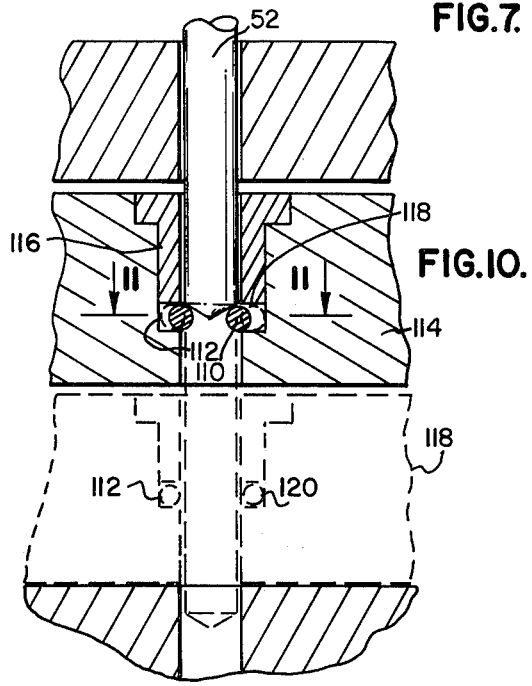
FIG. 10 is a sectional view similar to FIG. 4 but showing a further modified form of the invention.
Figure 11:
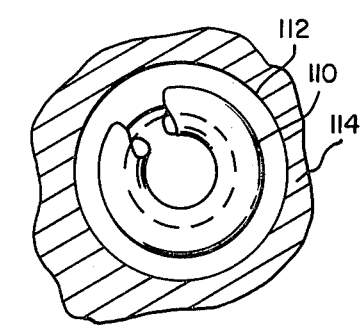
FIG. 11 is a fragmentary sectional view taken from the line 11—11 of FIG. 10.

In the modification, as shown in FIG. 10 of the drawings, the return rod 52 is disposed to force its way through a resilient ring; this resilient ring being a very stiff O-ring affording substantial resistance to the passage of the rod 52 and the ring 110 being captive in an enlarged slot 112; this slot 112 being an annular slot substantially larger radially than the normal size of the ring 110 shown in FIGS. 10 and 11 of the drawings. The slot 112 is disposed in an ejector pin carrying plate 114 similar to the plate 34 hereinbefore described. A pressed in bushing 116 is provided with an end 118 forming one side of the slot 112 and thereby mounting the resilient ring 110.

In operation, the return rod 52 as it passes into engagement with the ring 110, shown in FIG. 10 of the drawings, moves the ejector pin carrying plate 34 from the broken line position 116 in FIG. 1 of the drawings, to solid line position shown therein; and in FIG. 10 moves the plate 114 from the solid line position of the broken line position 118. At this time, increased force of the rod 52 forces the ring 110 to expand and allows the rod to move through the ring as it is distended to a broken line position 120 in the annular slot 112; thus, the solid line and broken line positions correspond with the functions hereinbefore described in relation to FIGS. 4 and 3 respectively.

Figure 12:
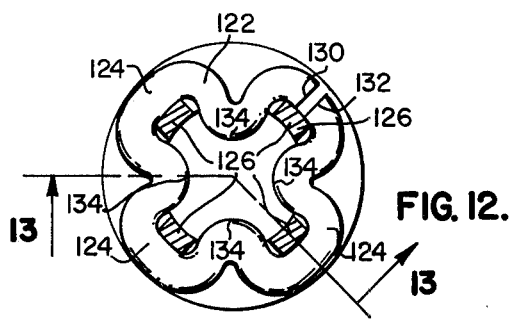
FIG. 12 is a view similar to FIG. 11 but showing a further modified form of the invention.
Figure 13:
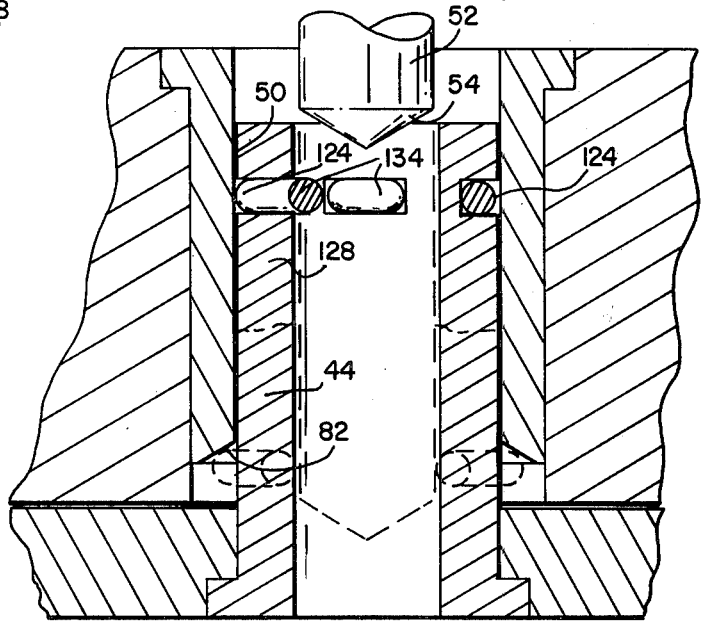
FIG. 13 is a view similar to FIG. 4 but taken from the line 13—13 of FIG. 12.

A further modification of the resilient ring structure is shown in FIGS. 12 and 13 wherein the resilient detent member 122 is provided with loops 124 disposed around bars 126 which are integral with a hollow tubular member 128 shown in FIG. 13 of the drawings. The detent member is provided with opposite ends 130 and 132 and is provided with inwardly directed cam portions 134 which are sufficiently close together so as to be engaged by the conical cam surface 54 of the rod 52.

The portions 124 are resiliently retracted into an overall diameter substantially less than the bore 50 of the sleeve 44 and the action of this device is similar to that shown in FIGS. 1 to 6 of the drawings in that the portions 124 of the detent means pass out of the bore and are expanded into engagement with the conical end surface 82 of the sleeve 44 as shown in FIG. 13. At this time, when the portions 124 are expanded out of the sleeve 44, the rod 52 passes therethrough and continuous on down to a position such as shown in FIG. 3 of the drawings. Accordingly, the rod 52 expands the detent structure by engaging the portions 134 and forcing the portions 124 outwardly to a position beyond the diameter of the bore 50 of the sleeve 44.

Accordingly, FIG. 13 as well as FIG. 12 disclose the resilient structure which is similar in function to that disclosed in FIGS. 1 to 6 of the drawings but being of a modified configuration.

It will be obvious to those skilled in the art that various modifications may be resorted to without departing from the spirit of the invention.

I claim:

1. A molding die employing an ejector pin retracting mechanism comprising:
   a first die member having a first molding cavity,
   a reciprocally operable member,
   an ejector pin mounted on said reciprocally operable member for movement into and out of said first molding cavity,
   a second die member having a second molding cavity,
   means for moving said first and second die members one relative to the other so as to open and close the first and second cavities,
   a return rod fixedly mounted on said second die member,
   a hollow cylindrical sleeve member defining a first bore extending therethrough fixedly mounted on said die adjacent said first die member,
   said rod being aligned concentrically with said first bore for reciprocal movement therein,
   a hollow tubular ejector pin return and detent means defining a second bore extending therethrough and having first and second ends,
   said detent means being connected to said pin carrying member in axial alignment with said first bore and having a plurality of spaced resilient fingers disposed around said first end of said second bore and biased toward each other,
   said fingers defining therebetween a circular cross-sectional configuration the diameter of which is slightly less than the diameter of said rod,
   the diameter of said second bore at its second end being larger than the diameter of said rod,
   said rod when forced between said fingers spreads them apart a distance greater than the diameter of said first bore and when moved from a position between said fingers into said first bore causes said ejector pin carrying member to move said ejector pin into said first molding cavity,
   said fingers when biased toward each other enough to cause them to enter said first bore prevents said return rod when said fingers are in said first bore from entering said second bore between said second fingers,
   whereby upon predetermined reciprocal movement of said rod causes it to push against the end of said fingers to move said reciprocal member in a direction to move said ejector pin from said first cavity,
   said fingers sequentially being forced out of said first bore causing said rod upon further movement to enter said second bore spreading said fingers apart and passing therebetween.

2. The molding die set forth in claim 1 wherein:
said fingers are provided with cam surfaces converging inwardly toward said second bore, and
said rod is provided with a frusto-conical end for engaging said cam surfaces to force said fingers apart.

3. The molding die set forth in claim 1 wherein:
said fingers extend from said second end of said second bore toward said first end thereof.

4. The molding die set forth in claim 1 wherein:
said fingers are pivotally mounted to said tubular ejector pin return and detent means at a common end thereof and are biased toward each other at the other end thereof.

5. The molding die set forth in claim 2 wherein:
said fingers are biased toward each other by a coil spring surrounding said other end of said fingers.

* * * * *